(12) United States Patent
Bao et al.

(10) Patent No.: US 12,207,282 B2
(45) Date of Patent: *Jan. 21, 2025

(54) INDICATION OF ERROR VECTOR MAGNITUDE CAPABILITY

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated

( * ) Notice: Subject to any disclaimer, the term of this patent is extended or adjusted under 35 U.S.C. 154(b) by 0 days.

This patent is subject to a terminal disclaimer.

(21) Appl. No.: 18/486,564

(22) Filed: Oct. 13, 2023

(65) Prior Publication Data

US 2024/0049267 A1 Feb. 8, 2024

Related U.S. Application Data

(63) Continuation of application No. 17/457,085, filed on Dec. 1, 2021, now Pat. No. 11,825,494.

(51) Int. Cl.
*H04W 64/00* (2009.01)
*H04L 5/00* (2006.01)
*H04L 69/24* (2022.01)
*H04W 72/51* (2023.01)

(52) U.S. Cl.
CPC .......... *H04W 72/51* (2023.01); *H04L 5/0048* (2013.01); *H04L 69/24* (2013.01); *H04W 64/003* (2013.01)

(58) Field of Classification Search
CPC ................ H04W 72/51; H04W 64/003; H04L 5/0048; H04L 69/24
See application file for complete search history.

(56) References Cited

U.S. PATENT DOCUMENTS

| 11,160,055 | B2 | 10/2021 | Kubota et al. | |
|---|---|---|---|---|
| 2017/0141875 | A1 | 5/2017 | Eliaz et al. | |
| 2019/0349822 | A1* | 11/2019 | Kim | H04W 36/0069 |
| 2022/0183111 | A1* | 6/2022 | Cuissard | H04L 12/4633 |
| 2023/0171797 | A1 | 6/2023 | Bao et al. | |
| 2024/0038664 | A1 | 2/2024 | Yoo et al. | |

FOREIGN PATENT DOCUMENTS

| WO | 2019199814 | | 10/2019 | |
|---|---|---|---|---|
| WO | WO-2020184954 A1 * | 9/2020 | | H04L 1/0003 |
| WO | 2021071581 A1 | | 4/2021 | |

(Continued)

OTHER PUBLICATIONS

3GPP (NTT Docomo et al.: "Summary on Rel-16 NR UE features related discussion", 3GPP Draft; RI-2112463, Nov. 2021).*

(Continued)

*Primary Examiner* — Lakeram Jangbahadur
(74) *Attorney, Agent, or Firm* — QUALCOMM Incorporated

(57) ABSTRACT

Various aspects of the present disclosure generally relate to wireless communication. In some aspects, a first device may generate an indication of an error vector magnitude (EVM) capability of the first device, where the first device is configured to transmit a positioning reference signal. The first device may transmit the indication to a second device. Numerous other aspects are described.

28 Claims, 8 Drawing Sheets

(56) References Cited

FOREIGN PATENT DOCUMENTS

WO    WO-2021154373 A1 *    8/2021    ........... H04L 5/0016
WO    WO-2023277782 A1 *    1/2023    ........... H04L 1/0001

OTHER PUBLICATIONS

Qualcomm (Qualcomm Incorporated: "Potential Positioning Enhancements for NR Rel-17 Positioning",3GPP Draft; RI-2008619, Oct. 2020).*
Farhadi., et al., U.S. Appl. No. 63/217,810, Jul. 2021.
International Search Report and Written Opinion—PCT/US2022/079468—ISA/EPO—Mar. 14, 2023.
Kumar., et al., India Provisional Application No. 201921040916, Oct. 2019.
Moderator (NTT Docomo, Inc): "Summary on Rel-16 NR UE Features Related Discussion", 3GPP TSG RAN WG1 #107-e, R1-2112463, 3rd Generation Partnership Project, Mobile Competence Centre, 650, Route Des Lucioles, F-06921 Sophia-Antipolis Cedex, FRANCE, vol. RAN WG1, No. e-Meeting, Nov. 11, 2021-Nov. 19, 2021, Nov. 15, 2021, XP052097793, pp. 1-12, p. 9.
Qualcomm Incorporated: "Potential Positioning Enhancements for NR Rel-17 Positioning", 3GPP TSG RAN WG1 #103-e, R1-2008619, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, XP051940245, 17 Pages, Section 3.2 Frequency-domain DL/UL PRS bundling, paragraph [05.4], p. 16.

* cited by examiner

INDICATION OF ERROR VECTOR MAGNITUDE CAPABILITY

RELATED APPLICATION

This application is a continuation of U.S. patent application Ser. No. 17/457,085, filed Dec. 1, 2021, which is incorporated herein by reference in its entirety.

FIELD OF THE DISCLOSURE

Aspects of the present disclosure generally relate to wireless communication and to techniques and apparatuses for indicating an error vector magnitude capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first device. The method may include generating an indication of an error vector magnitude (EVM) capability of the first device, where the first device is configured to transmit a positioning reference signal (PRS). The method may include transmitting the indication to a second device.

Some aspects described herein relate to a method of wireless communication performed by a second device. The method may include receiving, from a first device, an indication of an EVM capability of the first device. The method may include generating a PRS configuration based at least in part on the EVM capability. The method may include transmitting the PRS configuration to the first device.

Some aspects described herein relate to a first device for wireless communication. The first device may include a memory and one or more processors coupled to the memory. The one or more processors may be configured to generate an indication of an EVM capability of the first device, where the first device is configured to transmit a PRS. The one or more processors may be configured to transmit the indication to a second device.

Some aspects described herein relate to a second device for wireless communication. The second device may include a memory and one or more processors coupled to the memory. The one or more processors may be configured to receive, from a first device, an indication of an EVM capability of the first device. The one or more processors may be configured to generate a PRS configuration based at least in part on the EVM capability. The one or more processors may be configured to transmit the PRS configuration to the first device.

Some aspects described herein relate to a non-transitory computer-readable medium that stores a set of instructions for wireless communication by a first device. The set of instructions, when executed by one or more processors of the first device, may cause the first device to generate an indication of an EVM capability of the first device, where the first device is configured to transmit a PRS. The set of instructions, when executed by one or more processors of the first device, may cause the first device to transmit the indication to a second device.

Some aspects described herein relate to a non-transitory computer-readable medium that stores a set of instructions for wireless communication by a second device. The set of instructions, when executed by one or more processors of the second device, may cause the second device to receive, from a first device, an indication of an EVM capability of the first device. The set of instructions, when executed by one or more processors of the second device, may cause the second device to generate a PRS configuration based at least in part on the EVM capability. The set of instructions, when executed by one or more processors of the second device, may cause the second device to transmit the PRS configuration to the first device.

Some aspects described herein relate to an apparatus for wireless communication. The apparatus may include means for generating an indication of an EVM capability of the apparatus, where the apparatus is configured to transmit a PRS. The apparatus may include means for transmitting the indication to another apparatus.

Some aspects described herein relate to an apparatus for wireless communication. The apparatus may include means for receiving, from another apparatus, an indication of an EVM capability of the apparatus. The apparatus may include means for generating a PRS configuration based at least in part on the EVM capability. The apparatus may include means for transmitting the PRS configuration to the other apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
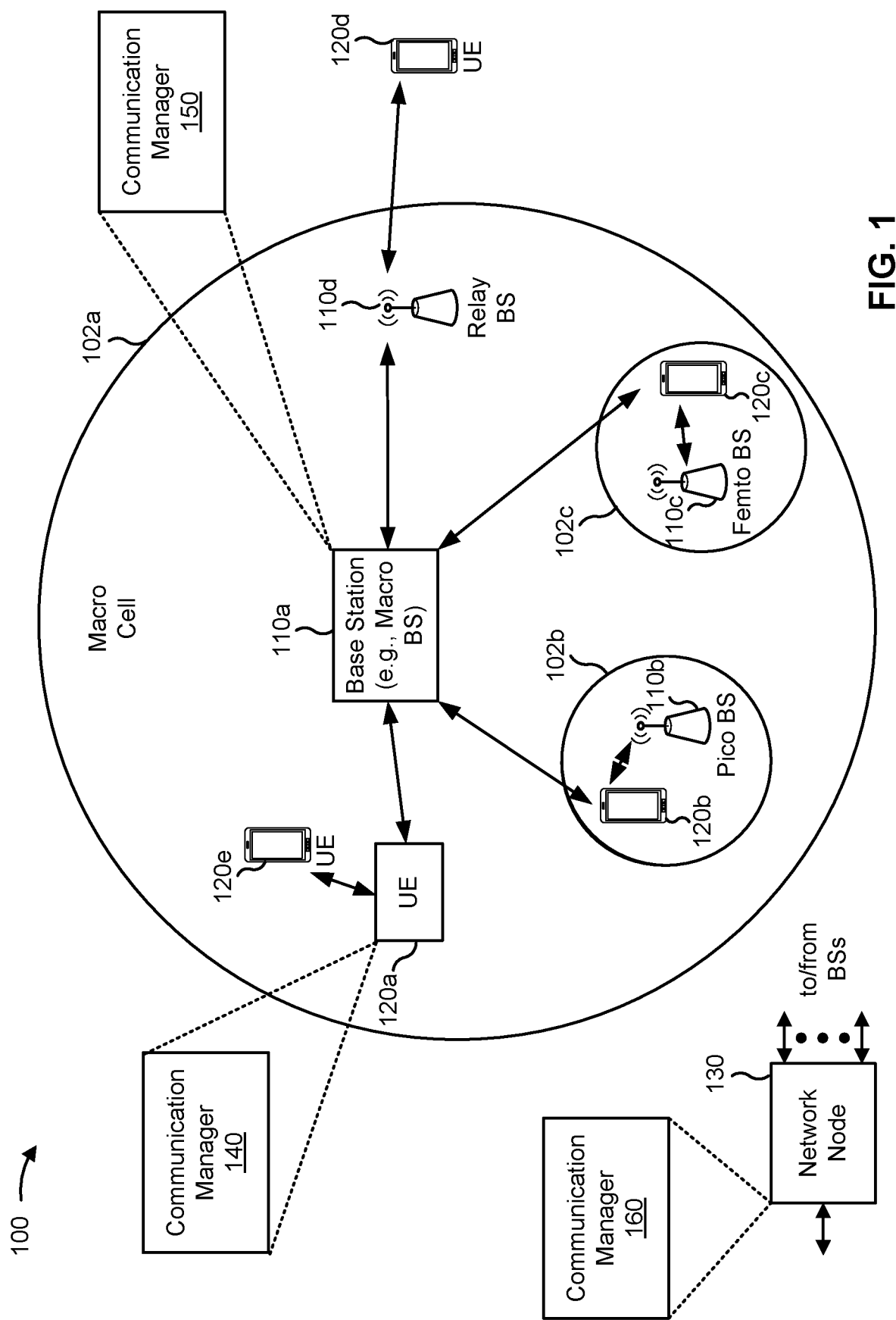
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120

(shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller may couple to or communicate with a set of base stations 110 and may provide coordination and control for these base stations 110. The network controller may communicate with the base stations 110 via a backhaul communication link. The base stations 110 may communicate with one another directly or indirectly via a wireless or wireline backhaul communication link.

A network node 130 may communicate with a UE 120 via a base station 110. The network node 130 may be part of a core network. The network node may provide location or positioning functionality for UEs. For example, the network node 130 may be a location management function (LMF) component.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., a UE 120, a base station 110) may include a communication manager 140 or 150. As described in more detail elsewhere herein, the communication manager 140 or 150 may generate an indication of an error vector magnitude (EVM) capability of the first device, where the first device is configured to transmit a positioning reference signal (PRS). The communication manager 140 or 150 may transmit the indication to a second device. Additionally, or alternatively, the communication manager 140 or 150 may perform one or more other operations described herein.

In some aspects, a second device (e.g., a UE 120, a base station 110, a network node 130) may include a communication manager 140, 150, or 160. As described in more detail elsewhere herein, the communication manager 140, 150, or 160 may receive, from a first device, an indication of an EVM capability of the first device. The communication manager 140, 150, or 160 may generate a PRS configuration based at least in part on the EVM capability and transmit the PRS configuration to the first device. Additionally, or alternatively, the communication manager 140, 150, or 160 may perform one or more other operations described herein.

As indicated above, FIG. 1 is provided as an example. Other examples may differ from what is described with regard to FIG. 1.

Figure 2:
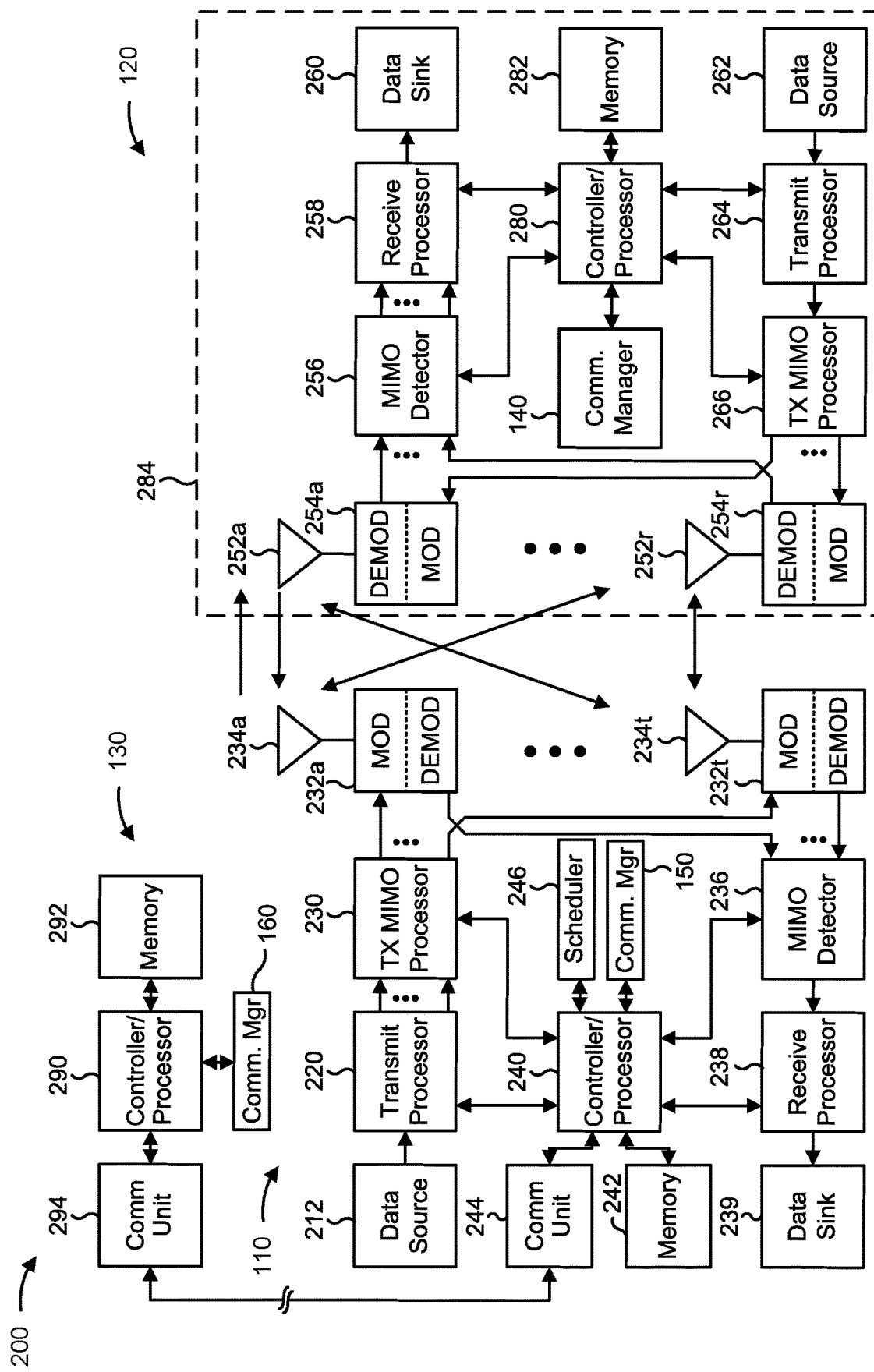
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network node 130 may include a communication unit 294, a controller/processor 290, and a memory 292. The network node 130 may include, for example, one or more devices in a core network. The network node 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network node 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, the controller/processor 290 of network node 130, and/or any other component(s) of FIG. 2 may perform one or more techniques associated with indicating an EVM capability for a PRS, as described in more detail elsewhere herein. For example, the controller/processor 240 of the base station 110, the controller/processor 280 of the UE 120, the controller/processor 290 of network node 130, and/or any other component(s) of FIG. 2 may perform or direct operations of, for example, process 500 of FIG. 5, process 600 of FIG. 6, and/or other processes as described herein. The memory 242, the memory 282, and the memory 292 may store data and program codes for the base station 110 and the UE 120, respectively. In some examples, the memory 242, the memory 282, and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the network node 130, may cause the one or more processors, the UE 120, the network node 130, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a first device (e.g., a UE 120, base station 110) includes means for generating an indication of an EVM capability of the first device, wherein the first device is configured to transmit a PRS; and/or means for transmitting the indication to a second device. In some aspects, the means for the first device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second device (e.g., a UE 120, base station 110, a network node 130) includes means for receiving, from a first device, an indication of an EVM capability of the first device; means for generating a PRS configuration based at least in part on the EVM capability; and/or means for transmitting the PRS configuration to the first device. In some aspects, the means for the second device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the second device to perform operations described herein may include, for example, one or more of communication manager 160, communication unit 294, controller/processor 290, or memory 292.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
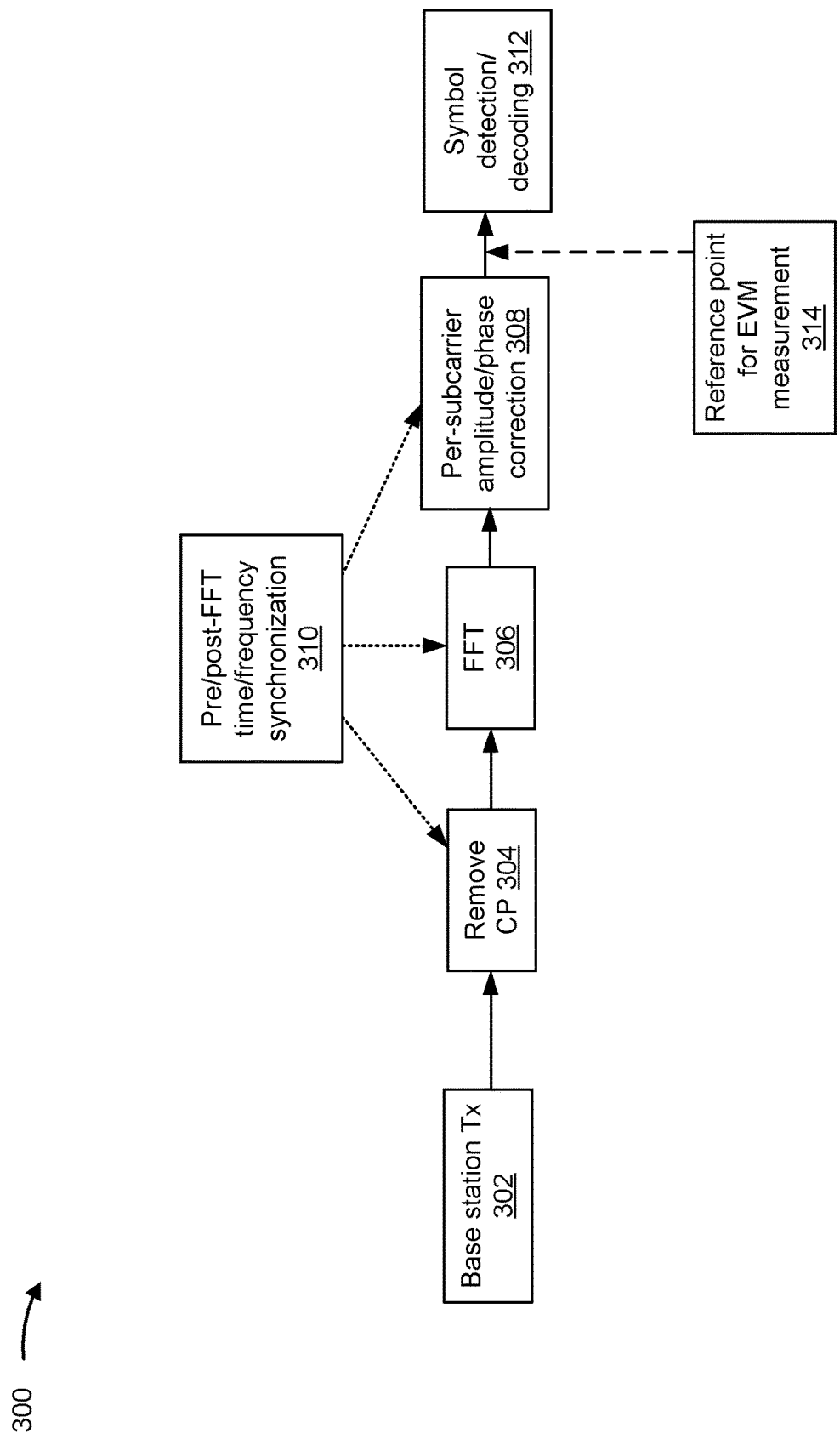
FIG. 3 is a diagram illustrating an example of error vector magnitude (EVM) calculation, in accordance with the present disclosure.

FIG. 3 is a diagram illustrating an example 300 of EVM calculation, in accordance with the present disclosure.

An EVM reflects circuit distortion at the transmitting side, and an EVM measurement may be the normalized ratio of the difference between a measured signal and an ideal or reference signal. The difference is called the error vector. The EVM may be a metric that characterizes phase coherence across bands over time.

Example 300 shows that an EVM measurement may take place after amplitude and phase correction and before symbol detection and decoding. For example, a transmitting device, such as a base station (BS), may transmit a signal (shown by reference number 302). A receiving device may remove a cyclic prefix (CP) from the signal (shown by reference number 304), perform a fast Fourier transform (FFT) operation (shown by reference number 306), and perform per-subcarrier amplitude/phase correction (shown by reference number 308). The receiving device may perform pre-FFT or post-FFT time/frequency synchronization (shown by reference number 310) and symbol detection/decoding (shown by reference number 312). As shown by reference number 314, a reference point for EVM measurement may be after the amplitude/phase correction and before the symbol detection/decoding.

The EVM measurement may be defined over one slot in the time domain t and over $N_{BW}^{RB}$ subcarriers in the frequency domain f such that $$EVM = \sqrt{\frac{\sum_{t \in T}\sum_{f \in F(t)}|Z'(t,f) - I(t,f)|^2}{\sum_{t \in T}\sum_{f \in F(t)}|I(t,f)|^2}},$$

where T is the set of symbols with the considered modulation scheme being active within the slot, F(t) is the set of subcarriers within the $N_{BW}^{RB}$ subcarriers with the considered modulation scheme being active in symbol t, I(t,f) is the ideal signal reconstructed by the measurement equipment in accordance with relevant transmission models, and Z'(t,f) is a specified modified signal under test.

The modified signal Z'(t,f) may compensate for time, frequency, amplitude, or phase impairments. For example, $$Z'(t, f) = \frac{FFT\{z(v - \Delta \tilde{t}) * e^{-j2\pi \Delta \tilde{f} v}\} \cdot e^{j2\pi f \Delta \tilde{t}}}{\tilde{a}(f) \cdot e^{j\tilde{\varphi}(f)}},$$

where $\Delta \tilde{t}$ is the sample timing difference between the fast Fourier transform (FFT) processing window and the nominal timing of the ideal signal. Note that two timing offsets are determined and the corresponding EVM is measured (maximum average EVM is used), where a is the frequency offset, and $\tilde{\varphi}(f)$ is the phase response of the transmit chain. The term $\tilde{a}(f)$ is the amplitude response of the transmit chain, where $$\tilde{a}(f) \cdot e^{j\tilde{\varphi}(f)} = \frac{Z'(f)}{I_{2(f)}}.$$

The estimation of the frequency offset may use an observation period for determining a sample timing difference of one slot. Similarly, the estimation of a time offset may use an observation period for determining the sample timing difference of one slot. The estimation of transmit chain amplitude and frequency response parameters may be represented as $$a(t, f) \cdot e^{j\tilde{\varphi}(t,f)} = \frac{Z'(t, f)}{I_{2(t,f)}},$$

which is $\tilde{a}(f)$ over the observation period.

For NR and for all bandwidths, the EVM measurement may be performed for each NR carrier over all allocated resource blocks and downlink subframes within 10 ms measurement periods. The boundaries of the EVM measurement periods need not be aligned with radio frame boundaries. EVM may be averaged over all allocated downlink resource blocks with the considered modulation scheme in the frequency domain and a minimum of $N_{dl}$ slots, where $N_{dl}$ is the number of slots in a 10 ms measurement interval.

Complex ratios (amplitude and phase) of the post-FFT acquired signal and the post-FFT ideal signal may be calculated for each reference signal over a 10 ms measurement interval. The EVM may be evaluated using a modulated signal in a physical downlink shared channel (PDSCH). The offset values may be estimated at least in the slot (frame) level and not the symbol level. The EVM may include both magnitude and phase distortion, and the amplitude impact in an EVM calculation may be removed. For carrier phase measurement, phase impairment may be more important and errors caused by amplitude distortion may be removed. Instead of frame-based amplitude estimation, slot-based amplitude estimation may be used for better amplitude tracking and compensation.

Before calculating the EVM, the measured waveform may be corrected by the sample timing offset and frequency offset. Then, the carrier leakage is removed from the measured waveform before calculating the EVM. For example, $$EVM = \sqrt{\frac{\sum_{v \in T_m}|z'(v) - i(v)|^2}{|T_m| * P_0}},$$

where $T_m$ is a set of $|T_m|$ modulation symbols with the considered modulation scheme being active within the measurement period, $z'(v)$ are the samples of the signal evaluated for the EVM, $i(v)$ is the ideal signal reconstructed by the measurement equipment, and $P_0$ is the average power of the ideal signal. For normalized symbols, $P_0$ is equal to 1. The basic EVM measurement interval is defined over one slot in the time domain for a physical uplink control channel (PUCCH) and a physical uplink shared channel (PUSCH) and over one preamble sequence for a physical random access channel (PRACH).

The root-mean-square average of the basic EVM measurements over 10 subframes for the average EVM case (or over 60 subframes for the reference signal EVM case) is not to exceed specified values for different modulation schemes, including values specified for a UE and/or a base station (e.g., gNB) in a standard. These values may include, in an example for a UE, an average EVM level requirement of 30% for Pi/2-binary phase-shift keying (BPSK), 17.5% or 18.5% for quadrature phase-shift keying (QPSK), 12.5% or 13.5% for 16 quadrature amplitude modulation (QAM), 8% or 9% for 64 QAM, and 3.5% or 4.5% for 256 QAM. For EVM evaluation purposes, all 13 PRACH preamble formats and all 5 PUCCH formats are considered to have the same EVM requirement as QPSK modulated. Values may be different for the gNB.

The measured waveform may be further equalized using the channel estimates subjected to the EVM equalizer spectrum flatness requirement. In the case of PUCCH and PUSCH, the uplink EVM analyzer may estimate the transmit chain equalizer coefficients $\tilde{a}(t, f)$ and $\tilde{\varphi}(t, f)$ used by the zero-forcing equalizer for all subcarriers by time averaging at each signal subcarrier of the amplitude and phase of the reference and data symbols. The time-averaging length may be one slot. The EVM measurement interval at UE may be one preamble sequence for the PRACH and one slot for PUCCH and PUSCH in the time domain. The offset values may be estimated in the symbol/slot level.

As indicated above, FIG. 3 is provided as an example. Other examples may differ from what is described with regard to FIG. 3.

Figure 4:
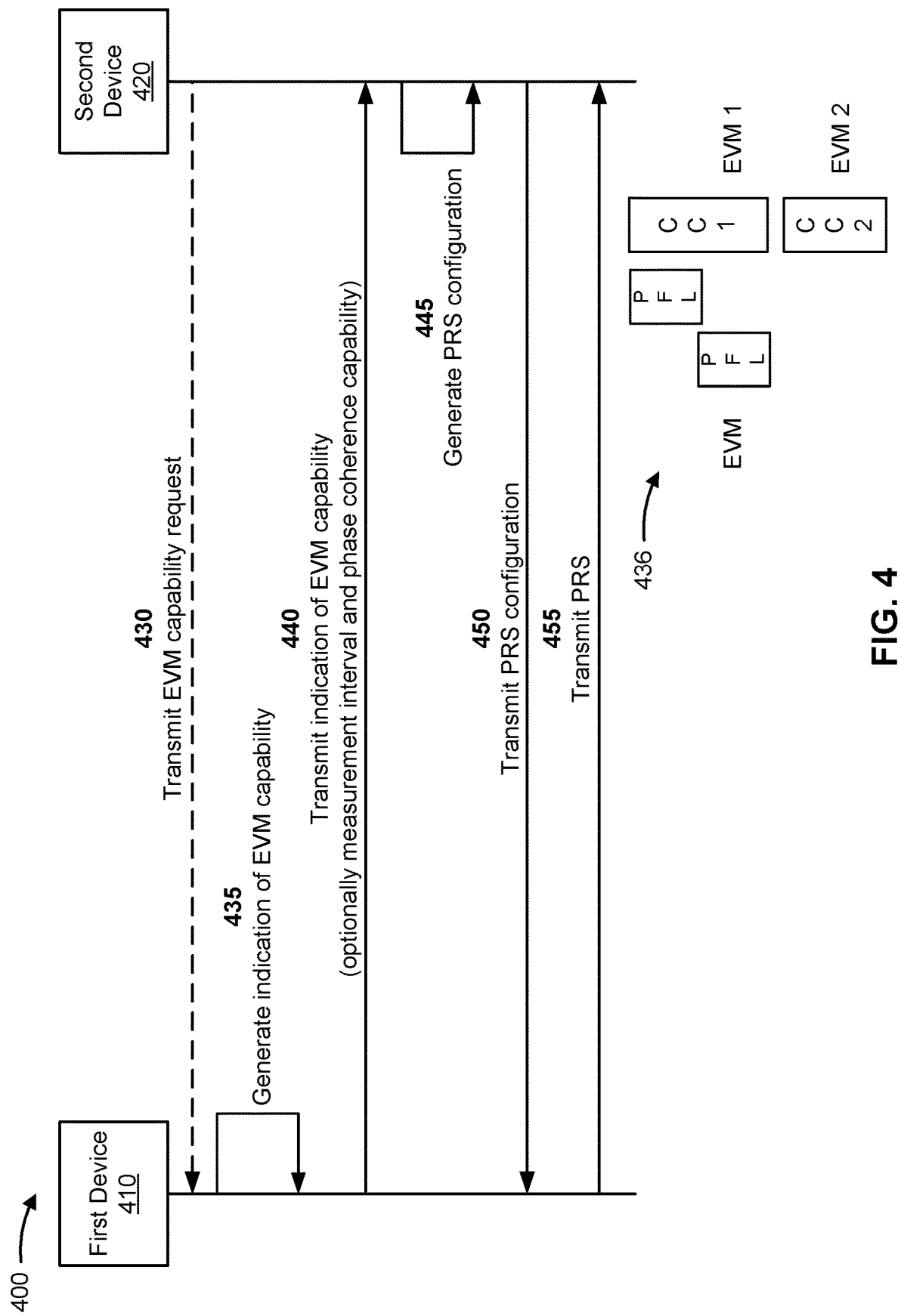
FIG. 4 is a diagram illustrating an example of indicating an EVM capability, in accordance with the present disclosure.

FIG. 4 is a diagram illustrating an example 400 of indicating an EVM capability, in accordance with the present disclosure. A first device 410 may be a UE 120 or the base station 110 and configured to transmit a PRS. A second device 420 may be a UE 120, the base station 110, or a network node 130 such as a location management function (LMF) component. The LMF is part of the NR positioning architecture. The LMF receives measurements and assistance information from the radio access network (RAN) and the UE to compute the position of the UE. The first device 410 and the second device 420 may communicate with each other, such as over wireless network 100.

EVM requirements are currently specified for reference signals on a PDSCH, a PUSCH, or a PUCCH. EVM requirements are defined per component carrier (CC) but not across multiple CCs. On the other hand, a PRS is not defined based on a CC and is instead defined based on a positioning frequency layer (PFL), which may involve a set of cells with the same carrier frequency. Although the PFL provides additional flexibility, an EVM requirement is not defined for the PFL, and there may not be any direct mapping between a CC and PFLs.

According to various aspects described herein, a first device may indicate an EVM capability to a second device that is a positioning entity or that is associated with a positioning entity. The EVM capability for the first device may include a threshold EVM that is not to be exceeded by a transmitted signal of the first device in a CC, a frequency band, or a PFL. The EVM capability may be an indication (e.g., matrix) for phase coherence across frequency bands and across time.

Currently, EVM requirements are hardcoded at production such that, for a particular MCS, a required EVM percentage may apply. However, rather than be restricted to the preset EVM requirements, the first device may indicate an EVM capability that is different than the EVM requirement that is hardcoded at production. This may provide for more flexibility with EVM requirements.

In some aspects, an EVM capability may be based at least in part on a reference signal of one CC. A spectrum of the CC may cover one or more PFLs. For intra-band PRS stitching within one CC, or carrier phase measurements within one CC, the EVM may be defined for the CC. That is, the EVM capability may apply to frequency bands of multiple PRSs within the CC or to carrier phase measurements within the CC.

In some aspects, the PRS may be defined based on a PFL, which may include a subcarrier spacing (SCS), a resource bandwidth, a starting physical resource block, or an offset, among other parameters. The PFL may be defined differently than for CCs. Accordingly, the EVM capability may correspond to a PFL. The EVM capability may correspond to a CC, among multiple CCs, that overlaps the most with one or more PFLs. There may be multiple EVM capabilities for multiple CCs.

If a PRS is defined based on a CC, there may be no basis for the PRS if no CC is configured. Therefore, in some aspects, the PRS may be defined based at least in part on the PFL such that PRS is independent of the PDSCH, the PUSCH, and the PUCCH. That is, if there is no communication of a PDSCH configuration, a PRS can still be configured. If the PRS is based on CC, no CC may be configured because no PDSCH is defined. Therefore, the first device may define the PRS based at least in part on the PFL.

One or more PFLs may fit within one CC (400 MHz), where the EVM is defined based at least in part on a reference signal of the CC. A single PRS of a single PFL (up to 400 MHz) may be located within the CC. For PRS stitching with multiple PFLs (e.g., 100 MHz each), the spectrum of the combined PRSs may be located within the CC. In some aspects, the PRS may be defined for a specific band (PFL or CC).

In some aspects, an EVM measurement interval may be enhanced. Current averaged EVM is calculated per 10 ms. For carrier phase-based positioning, phase coherence over a longer time may help to resolve integer cycle ambiguity. Therefore, an average EVM may be defined over a measurement interval that is greater than 10 ms (e.g., 20 ms, 40 ms) for a PRS signal. The EVM request and report may further include the measurement interval. The EVM measurement interval may indicate a sliding window, during which the phase coherence is maintained.

In some aspects, a wireless device may be able to maintain phase coherency longer than the EVM indicated, with the cost of more power and processing resources. For example, the device may be in a "boost" mode to maintain phase coherence across time. The device may use extra memory to store the phase of a previous PRS resource instance, calculate the phase of a next instance, and apply the phase adjustment to the next instance. All these operations require extra power and processing resources.

In this scenario, the device may further indicate the phase coherence capability to the positioning entity. The phase coherence capability may include a window during which the node can maintain phase coherence for a reference signal. The window may be defined in time (e.g., 40 ms) and the quantity of PRS resource instances (considering the PRS repetition in each instance). The phase coherence capability may include a periodicity between windows or a PRS resource identifier (ID). The first device may support this feature for a subset of PRS resources, and each PRS resource may be transmitted by a transmit beam. The phase coherence capability may include a phase coherence uncertainty or an accuracy level. Within a window, a receiving device may expect phase coherence for certain PRS resources from certain transmitting devices (e.g., NB, UE).

Example 400 shows the indication of an EVM capability. As shown by reference number 430, the second device 420 may request an EVM capability from the first device 410. As shown by reference number 435, the first device 410 may generate the EVM capability. The EVM capability may correspond to a PFL that is based at least in part on a PRS. In some aspects, the EVM capability may correspond to a CC, among multiple CCs, that overlaps the most with one or more PFLs, such as EVM1 shown by reference number 436. Such an EVM capability may differ from an EVM capability set for the first device 410 at production of the first device 410.

As shown by reference number 440, the first device 410 may transmit an indication of the EVM capability to the second device 420. This indication may be passed between different combinations of devices. For example, the first device 410 may be a UE or a base station, and the second device 420 may be an LMF component (EVM capability reported via a positioning protocol). The first device 410 and the second device 420 may both be UEs (EVM capability reported via sidelink or relay by base station). The first device 410 may be a base station, and the second device 420 may be a UE (EVM capability reported via Uu or relay by LMF).

As shown by reference number 445, the second device 420 may generate a PRS configuration based at least in part on the EVM capability indicated by the first device 410. For example, based at least in part on an EVM capability of the first device 410, the second device 420 (e.g., positioning entity) may schedule the first device 410 to transmit PRS resources with repetition within a window or EVM time frame such that the second device 420 can receive and measure at least a subset of the PRS resources. The second device 420 may expect that the carrier phase across the subset of PRS resources is continuous. In some aspects, if a positioning entity is separate from the second device 420, the positioning entity may transmit, to the second device 420, assistance data about the first device's EVM capability and or a phase coherence capability for PRS stitching carrier phase measurements. In another example, based at least in part on an EVM capability of the first device 410, a positioning entity (e.g., LMF or UE) may schedule a positioning scheme based at least in part on the PRS stitching, where the PRS is transmitted over two or more contiguous portions of spectrums, either within one CC or across CCs with optimal EVM conditions.

As shown by reference number 450, the second device 420 may transmit the PRS configuration to the first device 410. As shown by reference number 455, the first device 410 may transmit a PRS. The PRS, having benefited from an indication of an appropriate EVM capability, may have more phase coherence with phase carrier measurements and may be used more successfully by a positioning entity. As a result, positioning for the first device 410 may be more accurate, which may conserve processing resources and signaling resources.

As indicated above, FIG. 4 is provided as an example. Other examples may differ from what is described with regard to FIG. 4.

Figure 5:
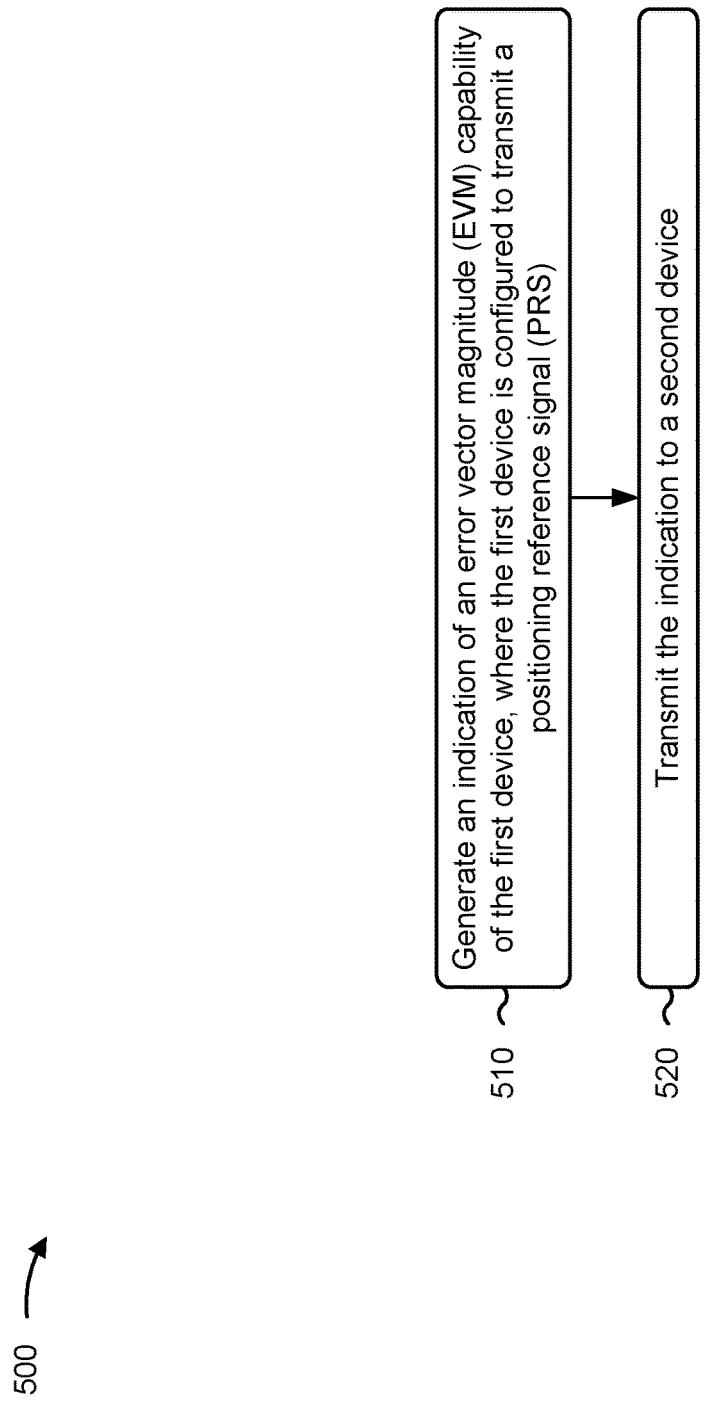
FIG. 5 is a diagram illustrating an example process performed, for example, by a first device, in accordance with the present disclosure.

FIG. 5 is a diagram illustrating an example process 500 performed, for example, by a first device, in accordance with the present disclosure. Example process 500 is an example where the first device (e.g., first device 410) performs operations associated with indicating an EVM capability.

As shown in FIG. 5, in some aspects, process 500 may include generating an indication of an EVM capability of the first device, where the first device is configured to transmit a PRS (block 510). For example, the first device (e.g., using communication manager 140 or 150 and/or generation component 708 depicted in FIG. 7) may generate an indication of an EVM capability of the first device, where the first device is configured to transmit a PRS, as described above.

As further shown in FIG. 5, in some aspects, process 500 may include transmitting the indication to a second device (block 520). For example, the first device (e.g., using communication manager 140 or 150 and/or transmission component 704 depicted in FIG. 7) may transmit the indication to a second device, as described above.

Process 500 may include additional aspects, such as any single aspect or any combination of aspects described below and/or in connection with one or more other processes described elsewhere herein.

In a first aspect, the EVM capability is based at least in part on a reference signal for a CC.

In a second aspect, alone or in combination with the first aspect, a spectrum of the CC covers one or more PFLs.

In a third aspect, alone or in combination with one or more of the first and second aspects, the EVM capability applies to frequency bands of multiple PRSs within the CC or to carrier phase measurements within the CC.

In a fourth aspect, alone or in combination with one or more of the first through third aspects, the EVM capability is based at least in part on a PRS within a PFL.

In a fifth aspect, alone or in combination with one or more of the first through fourth aspects, the EVM capability corresponds to a CC, among multiple CCs, that overlaps the most with one or more PFLs.

In a sixth aspect, alone or in combination with one or more of the first through fifth aspects, the first device is a base station and the second device is an LMF component.

In a seventh aspect, alone or in combination with one or more of the first through sixth aspects, the first device is a UE and the second device is an LMF component.

In an eighth aspect, alone or in combination with one or more of the first through seventh aspects, the first device is a UE and the second device is a UE.

In a ninth aspect, alone or in combination with one or more of the first through eighth aspects, the first device is a base station and the second device is a UE.

In a tenth aspect, alone or in combination with one or more of the first through ninth aspects, the EVM capability is based at least in part on an EVM average over a measurement interval that exceeds 10 milliseconds.

In an eleventh aspect, alone or in combination with one or more of the first through tenth aspects, process 500 includes transmitting an indication of the measurement interval.

In a twelfth aspect, alone or in combination with one or more of the first through eleventh aspects, the EVM capability is based at least in part on one or more of an amplitude or a phase estimation over a measurement interval that exceeds 10 milliseconds.

In a thirteenth aspect, alone or in combination with one or more of the first through twelfth aspects, process 500 includes transmitting a phase coherence capability of the first device to the second device.

In a fourteenth aspect, alone or in combination with one or more of the first through thirteenth aspects, the phase coherence capability indicates a window during which phase coherence is maintained, and wherein a size of the window is based at least in part on the EVM measurement interval.

In a fifteenth aspect, alone or in combination with one or more of the first through fourteenth aspects, the phase coherence capability indicates a periodicity between windows.

In a sixteenth aspect, alone or in combination with one or more of the first through fifteenth aspects, the phase coherence capability indicates a PRS resource.

In a seventeenth aspect, alone or in combination with one or more of the first through sixteenth aspects, the phase coherence capability indicates an uncertainty level or an accuracy level.

In an eighteenth aspect, alone or in combination with one or more of the first through seventeenth aspects, the phase coherence capability includes an expectation of a phase coherence for a specified PRS resource from the first device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
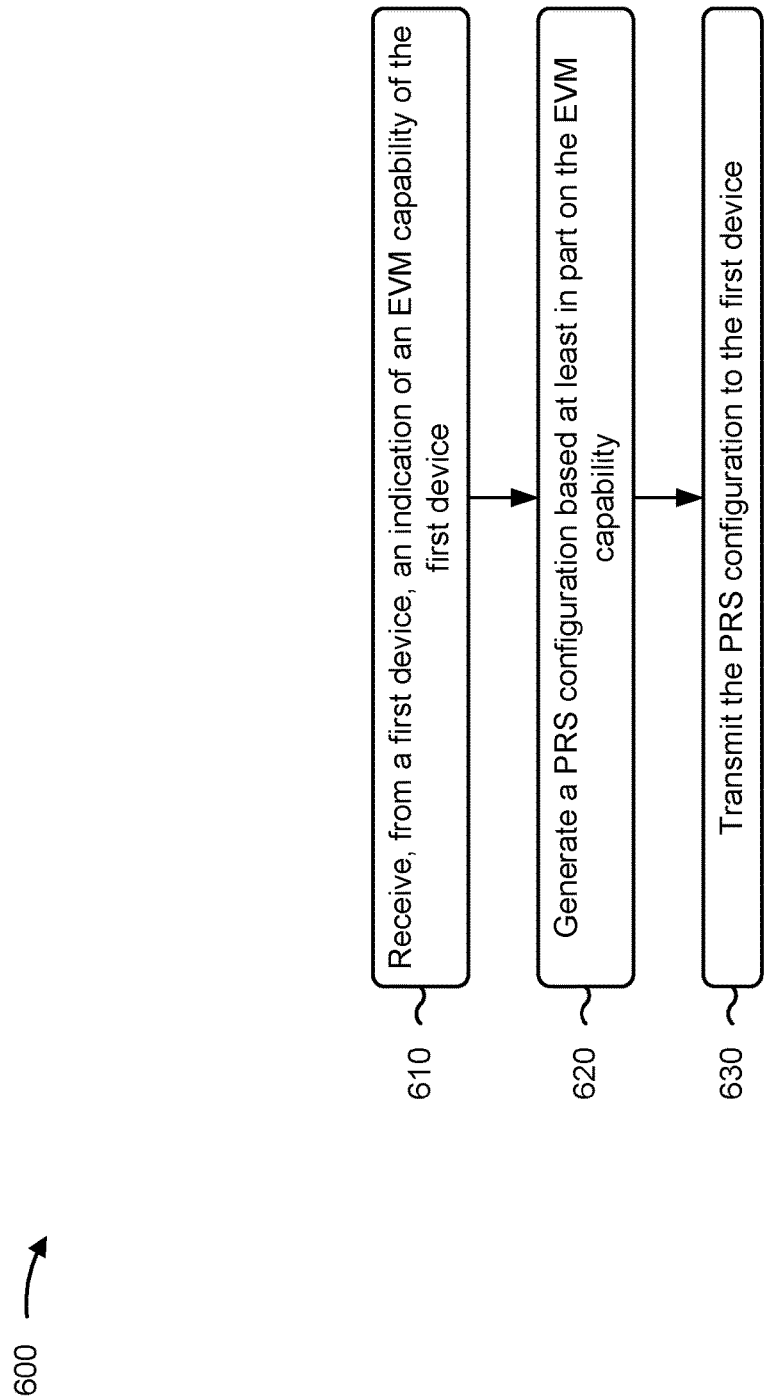
FIG. 6 is a diagram illustrating an example process performed, for example, by a second device, in accordance with the present disclosure.

FIG. 6 is a diagram illustrating an example process 600 performed, for example, by a second device, in accordance with the present disclosure. Example process 600 is an example where the second device (e.g., second device 420) performs operations associated with using an EVM capability for PRS configuration.

As shown in FIG. 6, in some aspects, process 600 may include receiving, from a first device, an indication of an EVM capability of the first device (block 610). For example, the second device (e.g., using communication manager 140, 150, or 160 and/or reception component 802 depicted in FIG. 8) may receive, from a first device, an indication of an EVM capability of the first device, as described above.

As further shown in FIG. 6, in some aspects, process 600 may include generating a PRS configuration based at least in part on the EVM capability (block 620). For example, the second device (e.g., using communication manager 140, 150, or 160 and/or generation component 808 depicted in FIG. 8) may generate a PRS configuration based at least in part on the EVM capability, as described above.

As further shown in FIG. 6, in some aspects, process 600 may include transmitting the PRS configuration to the first device (block 630). For example, the second device (e.g., using communication manager 140, 150, or 160 and/or transmission component 804 depicted in FIG. 8) may transmit the PRS configuration to the first device, as described above.

Process 600 may include additional aspects, such as any single aspect or any combination of aspects described below and/or in connection with one or more other processes described elsewhere herein.

In a first aspect, the EVM capability is based at least in part on a reference signal for a CC.

In a second aspect, alone or in combination with the first aspect, a spectrum of the CC covers one or more PFLs.

In a third aspect, alone or in combination with one or more of the first and second aspects, the EVM capability applies to frequency bands of multiple PRSs within the CC or to carrier phase measurements within the CC.

In a fourth aspect, alone or in combination with one or more of the first through third aspects, the EVM capability is based at least in part on a PRS within a PFL.

In a fifth aspect, alone or in combination with one or more of the first through fourth aspects, the EVM capability corresponds to a CC, among multiple CCs, that overlaps the most with one or more PFLs.

In a sixth aspect, alone or in combination with one or more of the first through fifth aspects, process 600 includes transmitting, to the first device, a request for the EVM capability of the first device.

In a seventh aspect, alone or in combination with one or more of the first through sixth aspects, the first device is a base station and the second device is an LMF component.

In an eighth aspect, alone or in combination with one or more of the first through seventh aspects, the first device is a UE and the second device is an LMF component.

In a ninth aspect, alone or in combination with one or more of the first through eighth aspects, the first device is a UE and the second device is a user equipment.

In a tenth aspect, alone or in combination with one or more of the first through ninth aspects, the first device is a base station and the second device is a UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
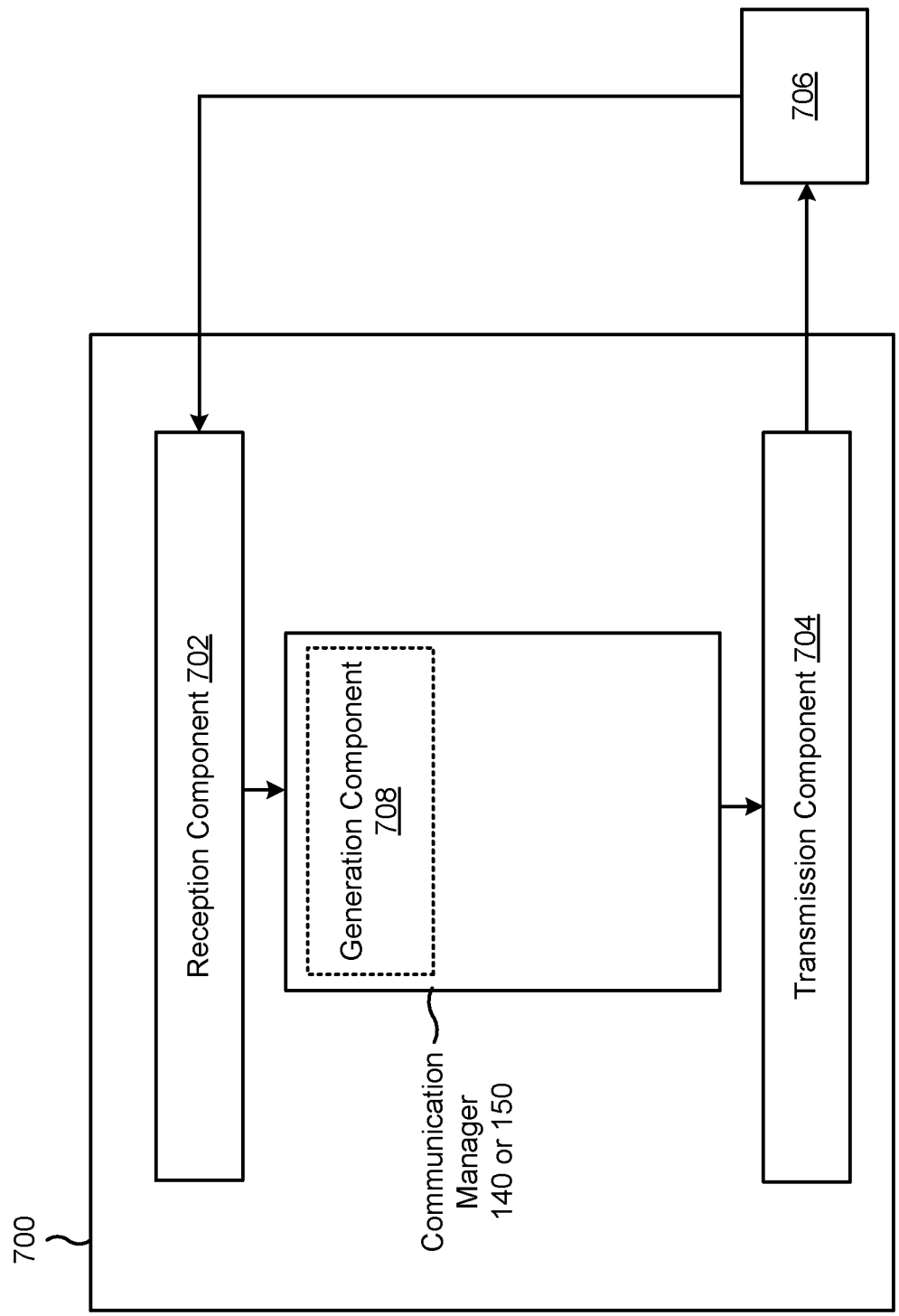
FIGS. 7-8 are diagrams of example apparatuses for wireless communication, in accordance with the present disclosure.

FIG. 7 is a diagram of an example apparatus 700 for wireless communication. The apparatus 700 may be a first device (e.g., first device 410), or a first device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140 or 150. The communication manager 140 or 150 may include a generation component 708, among other examples.

In some aspects, the apparatus 700 may be configured to perform one or more operations described herein in connection with FIGS. 1-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the first device described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the first device described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the first device described in connection with FIG. 2. In some aspects, the transmission component 704 may be co-located with the reception component 702 in a transceiver.

The generation component 708 may generate an indication of an EVM capability of the first device, where the first device is configured to transmit a PRS. The transmission component 704 may transmit the indication to a second device.

The transmission component 704 may transmit an indication of the measurement interval. The transmission component 704 may transmit a phase coherence capability of the first device to the second device.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
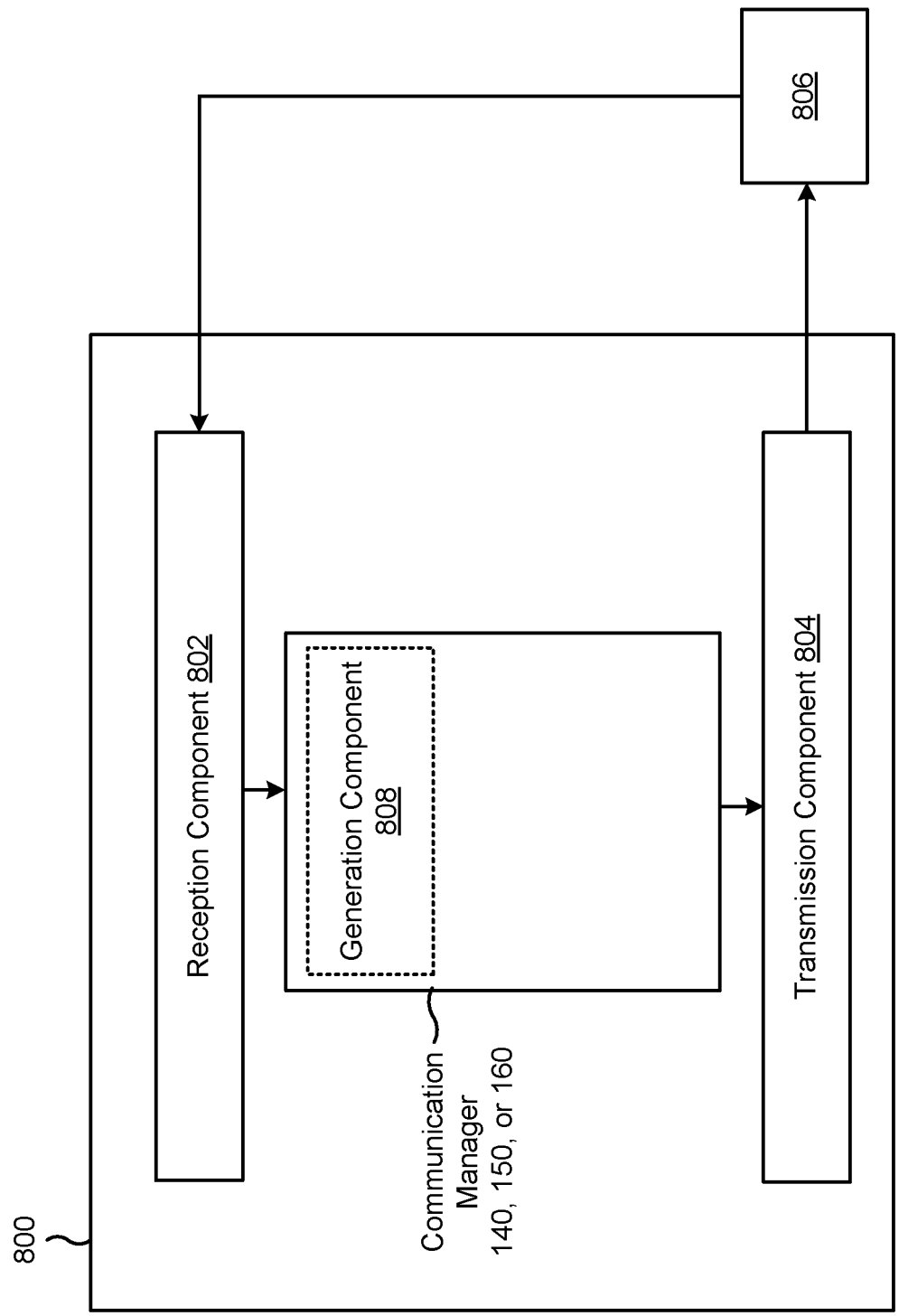

FIG. 8 is a diagram of an example apparatus 800 for wireless communication. The apparatus 800 may be a second device (e.g., second device 420), or a second device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140, 150, or 160. The communication manager 140, 150, or 160 may include a generation component 808, among other examples.

In some aspects, the apparatus 800 may be configured to perform one or more operations described herein in connection with FIGS. 1-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the second device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the second device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the second device described in connection with FIG. 2. In some aspects, the transmission component 804 may be co-located with the reception component 802 in a transceiver.

The reception component 802 may receive, from a first device, an indication of an EVM capability of the first device. The generation component 808 may generate a PRS configuration based at least in part on the EVM capability. The transmission component 804 may transmit the PRS configuration to the first device.

The transmission component 804 may transmit, to the first device, a request for the EVM capability of the first device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first device, comprising: generating an indication of an error vector magnitude (EVM) capability of the first device, wherein the first device is configured to transmit a positioning reference signal (PRS); and transmitting the indication to a second device.

Aspect 2: The method of Aspect 1, wherein the EVM capability is based at least in part on a reference signal for a component carrier (CC).

Aspect 3: The method of Aspect 2, wherein a spectrum of the CC covers one or more positioning frequency layers (PFLs).

Aspect 4: The method of Aspect 2, wherein the EVM capability applies to frequency bands of multiple PRSs within the CC or to carrier phase measurements within the CC.

Aspect 5: The method of any of Aspects 1-4, wherein the EVM capability is based at least in part on a PRS within a positioning frequency layer (PFL).

Aspect 6: The method of Aspect 5, wherein the EVM capability corresponds to a component carrier (CC), among multiple CCs, that overlaps the most with one or more PFLs.

Aspect 7: The method of any of Aspects 1-6, wherein the first device is a base station and the second device is a location management function component.

Aspect 8: The method of any of Aspects 1-6, wherein the first device is a user equipment and the second device is a location management function component.

Aspect 9: The method of any of Aspects 1-6, wherein the first device is a user equipment and the second device is a user equipment.

Aspect 10: The method of any of Aspects 1-6, wherein the first device is a base station and the second device is a user equipment.

Aspect 11: The method of any of Aspects 1-10, wherein the EVM capability is based at least in part on an EVM average over a measurement interval that exceeds 10 milliseconds.

Aspect 12: The method of Aspect 11, further comprising transmitting an indication of the measurement interval.

Aspect 13: The method of any of Aspects 1-12, wherein the EVM capability is based at least in part on one or more of an amplitude or a phase estimation over a measurement interval that exceeds 10 milliseconds.

Aspect 14: The method of any of Aspects 1-13, further comprising transmitting a phase coherence capability of the first device to the second device.

Aspect 15: The method of Aspect 14, wherein the phase coherence capability indicates a window during which phase coherence is maintained, and wherein a size of the window is based at least in part on the EVM measurement interval.

Aspect 16: The method of Aspect 15, wherein the phase coherence capability indicates a periodicity between windows.

Aspect 17: The method of Aspect 14, wherein the phase coherence capability indicates a PRS resource.

Aspect 18: The method of Aspect 14, wherein the phase coherence capability indicates an uncertainty level or an accuracy level.

Aspect 19: The method of Aspect 14, wherein the phase coherence capability includes an expectation of a phase coherence for a specified PRS resource from the first device.

Aspect 20: A method of wireless communication performed by a second device, comprising: receiving, from a first device, an indication of an error vector magnitude (EVM) capability of the first device; generating a positioning reference signal (PRS) configuration based at least in part on the EVM capability; and transmitting the PRS configuration to the first device.

Aspect 21: The method of Aspect 20, wherein the EVM capability is based at least in part on a reference signal for a component carrier (CC).

Aspect 22: The method of Aspect 21, wherein a spectrum of the CC covers one or more positioning frequency layers (PFLs).

Aspect 23: The method of any of Aspects 20-22, wherein the EVM capability applies to frequency bands of multiple PRSs within the CC or to carrier phase measurements within the CC.

Aspect 24: The method of any of Aspects 20-22, wherein the EVM capability is based at least in part on a PRS within a positioning frequency layer (PFL).

Aspect 25: The method of Aspect 24, wherein the EVM capability corresponds to a component carrier (CC), among multiple CCs, that overlaps the most with one or more PFLs.

Aspect 26: The method of any of Aspects 20-25, further comprising transmitting, to the first device, a request for the EVM capability of the first device.

Aspect 27: The method of any of Aspects 20-26, wherein the first device is a base station and the second device is a location management function component.

Aspect 28: The method of any of Aspects 20-26, wherein the first device is a user equipment and the second device is a location management function component.

Aspect 29: The method of any of Aspects 20-26, wherein the first device is a user equipment and the second device is a user equipment.

Aspect 30: The method of any of Aspects 20-26, wherein the first device is a base station and the second device is a user equipment.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
   one or more memories; and
   one or more processors, coupled to the one or more memories, configured to:
      transmit, to a second device, an indication of an error vector magnitude (EVM) capability of the first device that comprises a threshold EVM; and
      receive, from the second device, a positioning reference signal (PRS) configuration that is based, at least in part, on the indicated EVM capability of the first device,
   wherein the one or more processors are configured to transmit a phase coherence capability of the first device to the second device, wherein the phase coherence capability indicates a window during which phase coherence is maintained, and wherein a size of the window is based, at least in part, on EVM measurement interval.

2. The first device of claim 1, further comprising:
   transmitting a PRS to the second device based, at least in part, on receiving the PRS configuration.

3. The first device of claim 1, wherein the threshold EVM corresponds to an EVM that is not to be exceeded by a signal transmitted by the first device.

4. The first device of claim 1, wherein the indicated EVM capability is based, at least in part, on a reference signal for a component carrier (CC).

5. The first device of claim 4, wherein a spectrum of the CC covers one or more positioning frequency layers (PFLs).

6. The first device of claim 4, wherein the threshold EVM applies to frequency bands of multiple PRSs within the CC or to carrier phase measurements within the CC.

7. The first device of claim 1, wherein:
   the threshold EVM within the indicated EVM capability corresponds to a positioning frequency layer (PFL); and
   the PFL is based, at least in part, on a PRS within the PFL.

8. The first device of claim 1, wherein the indicated EVM capability corresponds to a component carrier (CC), among multiple CCs that overlap with one or more positioning frequency layers (PFLs).

9. The first device of claim 1, wherein the first device is a base station or a user equipment and the second device is a location management function component.

10. The first device of claim 1, wherein the first device is a user equipment and the second device is a user equipment.

11. The first device of claim 1, wherein the first device is a base station and the second device is a user equipment.

12. The first device of claim 1, wherein the indicated EVM capability is based, at least in part, on an EVM average over a measurement interval that exceeds 10 milliseconds.

13. The first device of claim 12, wherein the one or more processors are configured to transmit an indication of the measurement interval.

14. The first device of claim 1, wherein the indicated EVM capability is based, at least in part, on one or more of an amplitude or a phase estimation over a measurement interval that exceeds 10 milliseconds.

15. The first device of claim 1, wherein the phase coherence capability indicates a periodicity between windows.

16. The first device of claim 1, wherein the phase coherence capability indicates a PRS resource.

17. The first device of claim 1, wherein the phase coherence capability indicates an uncertainty level or an accuracy level.

18. The first device of claim 1, wherein the phase coherence capability includes an expectation of a phase coherence for a specified PRS resource from the first device.

19. A second device for wireless communication, comprising, one or more memories; and
one or more processors, coupled to the one or more memories, configured to:
receive, from a first device, an indication of an error vector magnitude (EVM) capability of the first device that comprises a threshold EVM; and
transmit, to the second device, a positioning reference signal (PRS) configuration that is based, at least in part, on the indicated EVM capability of the first device,
wherein the one or more processors are configured to receive, from the first device, a phase coherence capability of the first device, wherein the phase coherence capability indicates a window during which phase coherence is maintained, and wherein a size of the window is based, at least in part, on EVM measurement interval.

20. The second device of claim 19, further comprising:
receiving a PRS from the first device based, at least in part, on transmitting the PRS configuration.

21. The second device of claim 19, wherein the threshold EVM corresponds to an EVM that is not to be exceeded by a signal transmitted by the first device.

22. The second device of claim 19, wherein the indicated EVM capability is based, at least in part, on a reference signal for a component carrier (CC).

23. The second device of claim 22, wherein a spectrum of the CC covers one or more positioning frequency layers (PFLs).

24. The second device of claim 22, wherein the threshold EVM applies to frequency bands of multiple PRSs within the CC or to carrier phase measurements within the CC.

25. The second device of claim 19, wherein:
the threshold EVM within the indicated EVM capability corresponds to a positioning frequency layer (PFL); and
the PFL is based, at least in part, on a PRS within the PFL.

26. The second device of claim 19, wherein the indicated EVM capability corresponds to a component carrier (CC), among multiple CCs that overlap with one or more positioning frequency layers (PFLs).

27. A method of wireless communication performed by a first device, comprising:
transmitting, to a second device, an indication of an error vector magnitude (EVM) capability of the first device that comprises a threshold EVM; and
receiving, from the second device, a positioning reference signal (PRS) configuration that is based, at least in part, on the indicated EVM capability of the first device,
wherein the method by the first device further comprising:
transmitting a phase coherence capability of the first device to the second device, wherein the phase coherence capability indicates a window during which phase coherence is maintained, and wherein a size of the window is based, at least in part, on EVM measurement interval.

28. A method of wireless communication performed by a second device, comprising:
receiving, from a first device, an indication of an error vector magnitude (EVM) capability of the first device that comprises a threshold EVM; and
transmitting, to the second device, a positioning reference signal (PRS) configuration that is based, at least in part, on the indicated EVM capability of the first device,
wherein the method performed by the second device further comprising:
receiving, from the first device, a phase coherence capability of the first device, wherein the phase coherence capability indicates a window during which phase coherence is maintained, and wherein a size of the window is based, at least in part, on EVM measurement interval.

* * * * *